United States Patent
Duffield

(10) Patent No.: US 7,551,837 B2
(45) Date of Patent: Jun. 23, 2009

(54) SEQUENCE COUNTER FOR AN AUDIO VISUAL STREAM

(75) Inventor: David Jay Duffield, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 946 days.

(21) Appl. No.: 10/487,738

(22) PCT Filed: Jun. 28, 2002

(86) PCT No.: PCT/US02/20503

§ 371 (c)(1),
(2), (4) Date: Feb. 24, 2004

(87) PCT Pub. No.: WO03/021959

PCT Pub. Date: Mar. 13, 2003

(65) Prior Publication Data

US 2004/0233811 A1    Nov. 25, 2004

Related U.S. Application Data

(60) Provisional application No. 60/316,373, filed on Aug. 31, 2001.

(51) Int. Cl.
*H04N 7/00* (2006.01)
(52) U.S. Cl. .......................................... 386/95; 386/46
(58) Field of Classification Search ................... 386/94, 386/95, 46, 1, 52
See application file for complete search history.

(56) References Cited

U.S. PATENT DOCUMENTS

| | | | |
|---|---|---|---|
| 2,086,585 A | 7/1937 | Taub et al. | 260/127 |
| 2,087,132 A | 7/1937 | Taub et al. | 260/127 |
| 2,108,765 A | 2/1938 | Domagk | 167/30 |
| 2,209,383 A | 7/1940 | Bock | 8/116 |
| 2,439,969 A | 4/1948 | Fourneau | 260/338 |
| 2,445,393 A | 7/1948 | Fourneau | 260/338 |
| 2,513,747 A | 7/1950 | Sallman et al. | 260/338 |
| 2,606,909 A | 8/1952 | Blicke | 260/338 |
| 2,689,790 A | 9/1954 | Mowry et al. | 71/2.7 |
| 2,950,253 A | 8/1960 | Kling et al. | 252/152 |
| 3,054,678 A | 9/1962 | Michener et al. | 99/150 |
| 3,694,473 A | 9/1972 | Eibl et al. | 260/403 |
| 4,093,714 A | 6/1978 | Tolman et al. | 424/180 |
| 4,096,278 A | 6/1978 | Queuille | 424/329 |
| 4,119,714 A | 10/1978 | Kny et al. | 424/199 |

(Continued)

FOREIGN PATENT DOCUMENTS

DE    37 26 945 A1    2/1989

(Continued)

OTHER PUBLICATIONS

Search report dated Oct. 7, 2002.

(Continued)

*Primary Examiner*—Robert Chevalier
(74) *Attorney, Agent, or Firm*—Robert D. Shedd; Paul P. Kiel

(57) ABSTRACT

A conditional access system and method including a first source device and a first sink device coupled to the first source device, wherein the source device includes a module for generating sequence counter values and appending the values to content transmitted from the source device to the sink device.

21 Claims, 2 Drawing Sheets

U.S. PATENT DOCUMENTS

| | | | | |
|---|---|---|---|---|
| 4,159,988 | A | 7/1979 | Eibl et al. | 260/340.9 R |
| 4,221,732 | A | 9/1980 | Oette et al. | 260/403 |
| 4,235,877 | A | 11/1980 | Fullerton | 424/89 |
| 4,291,024 | A | 9/1981 | Turcotte | 424/180 |
| 4,329,302 | A | 5/1982 | Hanahan et al. | 260/925 |
| 4,426,525 | A | 1/1984 | Hozumi et al. | 546/22 |
| 4,444,766 | A | 4/1984 | Bosies et al. | 424/211 |
| 4,471,113 | A | 9/1984 | MacCoss | 536/29 |
| 4,540,521 | A | 9/1985 | Garst et al. | 260/459 |
| 4,559,157 | A | 12/1985 | Smith et al. | 424/401 |
| 4,608,392 | A | 8/1986 | Jacquet et al. | 424/401 |
| 4,619,917 | A | 10/1986 | Lee et al. | 514/77 |
| 4,622,392 | A | 11/1986 | Hong et al. | 536/28.5 |
| 4,661,509 | A | 4/1987 | Gordon et al. | 514/397 |
| 4,724,232 | A | 2/1988 | Rideout et al. | 514/50 |
| 4,797,479 | A | 1/1989 | Shuto et al. | 536/28.5 |
| 4,816,450 | A | 3/1989 | Bell et al. | 514/25 |
| 4,820,508 | A | 4/1989 | Wortzman | 424/59 |
| 4,826,823 | A | 5/1989 | Cook et al. | 514/46 |
| 4,835,263 | A | 5/1989 | Nguyen et al. | 536/27 |
| 4,837,023 | A | 6/1989 | Eibl | 424/439 |
| 4,841,039 | A | 6/1989 | Chu et al. | 536/29 |
| 4,880,782 | A | 11/1989 | Eckstein et al. | 514/45 |
| 4,921,951 | A | 5/1990 | Shuto et al. | 536/28.5 |
| 4,938,949 | A | 7/1990 | Borch et al. | 514/476 |
| 4,992,478 | A | 2/1991 | Geria | 514/782 |
| 4,997,761 | A | 3/1991 | Jett-Tilton | 435/375 |
| 5,026,687 | A | 6/1991 | Yarchoan et al. | 514/45 |
| 5,034,394 | A | 7/1991 | Daluge | 514/261 |
| 5,138,045 | A | 8/1992 | Cook et al. | 536/27 |
| 5,221,696 | A | 6/1993 | Ke et al. | 514/786 |
| 5,496,546 | A | 3/1996 | Wang et al. | 424/78.36 |
| 5,512,671 | A | 4/1996 | Piantadosi | 536/26.1 |
| 5,614,548 | A | 3/1997 | Piantadosi et al. | 514/440 |
| 5,633,388 | A | 5/1997 | Diana et al. | 548/305.7 |
| 5,770,584 | A | 6/1998 | Kucera et al. | 514/77 |
| 5,830,905 | A | 11/1998 | Diana et al. | 514/322 |
| 5,846,964 | A | 12/1998 | Ozeki | 514/182 |
| 5,891,874 | A | 4/1999 | Colacino et al. | 514/234.5 |
| 5,922,757 | A | 7/1999 | Chojkier | 514/458 |
| 5,962,437 | A | 10/1999 | Kucera et al. | 514/77 |
| 6,030,960 | A | 2/2000 | Morris-Natschke et al. | 514/77 |
| 6,456,783 | B1* | 9/2002 | Ando et al. | 386/125 |
| 6,670,341 | B1 | 12/2003 | Kucera et al. | 514/77 |
| 2001/0030943 | A1* | 10/2001 | Gregg et al. | 370/231 |
| 2003/0159043 | A1* | 8/2003 | Epstein | 713/176 |

FOREIGN PATENT DOCUMENTS

| | | |
|---|---|---|
| DE | 39 34 820 A1 | 4/1991 |
| DE | 40 10 228 A1 | 10/1991 |
| DE | 199 14 474 | 10/1999 |
| EP | 0 094 586 | 11/1983 |
| EP | 0 109 255 | 5/1984 |
| EP | 0 142 333 | 5/1985 |
| EP | 0 145 303 | 6/1985 |
| EP | 0 146 258 | 6/1985 |
| EP | 0 252 310 | 1/1988 |
| EP | 0 310 109 | 4/1989 |
| EP | 0 335 396 | 4/1989 |
| EP | 0 348 859 | 1/1990 |
| EP | 0 350 287 | 1/1990 |
| EP | 0 416 401 | 3/1991 |
| EP | 0 434 450 | 6/1991 |
| EP | 0 506 704 | 7/1991 |
| EP | 0 632 048 | 1/1995 |
| EP | 975165 | 1/2000 |
| FR | 1561630 | 3/1969 |
| GB | 2 239 243 A | 6/1991 |
| JP | 42-13841 | 8/1967 |
| JP | 49-100224 | 9/1974 |
| JP | 61-238793 | 10/1986 |
| JP | 1029312 | 1/1989 |
| JP | 08-268890 | 10/1996 |
| JP | 10-101591 | 4/1998 |
| JP | 10-243374 | 9/1998 |
| WO | 90/00555 | 1/1990 |
| WO | 90/05736 | 5/1990 |
| WO | 90/15601 | 12/1990 |
| WO | 91/05558 | 5/1991 |
| WO | 91/09602 | 7/1991 |
| WO | 91/18914 | 12/1991 |
| WO | 91/19726 | 12/1991 |
| WO | 92/03462 | 3/1992 |
| WO | 92/06192 | 4/1992 |
| WO | 93/00910 | 1/1993 |
| WO | 93/08807 | 5/1993 |
| WO | 93/16091 | 8/1993 |
| WO | 93/16092 | 8/1993 |
| WO | 93/17020 | 9/1993 |
| WO | 93/21191 | 10/1993 |
| WO | WO 94/28908 | 12/1994 |
| WO | WO 98/17679 | 4/1998 |
| WO | WO 98/22496 | 5/1998 |
| WO | WO 99/07734 | 2/1999 |
| WO | 00/01149 | 1/2000 |
| WO | WO 00/04727 | 1/2000 |

OTHER PUBLICATIONS

Aggarwal, S. K. et al., "Synthesis and Biological Evaluation of Prodrugs of Zidovudine," *J. Med. Chem.*, 33, 1505-10, 1990.

Alt M. et al., "Core Specific Antisense Phosphorothioate Oligodeoxynucleotides as Potent and Specific Inhibitors of Hepatitis C Viral Translation," *Archives of Virology* 142:589-599, 1997.

Alt M. et al., "Specific Inhibition of Hepatitis C Viral GeneExpression by Antisense Phosphorothioate Oligodeoxynucleotides," *Hepatology* 22:707-717, Sep. 1995.

Amari et al., "Isolation of Experimental Anti-AIDS Glycerophospholipids by Micro-Preparative Reversed-Phase High-Performance Liquid Chromatography," *Journal of Chromatography*, 590, 153-161, 1992.

Anderson, L. J. et al., "Antigenic Characterization of Respiratory Syncytial Virus Strains with Monoclonal Antibodies," *Journal of Infectious Diseases*, 151:626-633, Apr. 1985.

Attwood, M. R. et al., "The Design and Synthesis of Potent Inhibitors of Hepatitis C Virus NS3-4A Proteinase," *Antiviral Chemistry and Chemotherapy* 10:259-273, Sep. 1999.

Bartlett, *Infectious Diseases in Clinical Practice*, 5:172-179, 1996.

Berdel et al., "Cyto Toxicity of Thio Ether Lyso Phospho Lipids in Leukemias and Tumors of Human Origin," *Cancer Research*, vol. 43, 5538-5543, 1983.

Berenguer, M. et al., "Hepatitis C Virus in the Transplant Setting," *Antiviral Therapy* 3(Suppl. 3):125-136, 1998.

Boldanova, N. B. et al., "Protective Effect of Phosphatidylcholine-Containing Liposomes in Experimental Toxic Hepatitis," *Vopr. Med. Khim*, 32, No. 3 (1986) Chemical Abstracts, 105, p. 67, Abstract No. 35587k (1986).

Bosies, E. et al., "Preparation of Lecithin Analogs as Retrovirucides and Virucides," *Chemical Abstracts*, 115CA; 72142p, 1991.

Braekman et al., *Proc. Amer. Soc. for Clinical Oncology*, Abstract #810, 1997.

Capizzi, Investigational New Drugs 14: 249-256, 1996.

Chen, "Design and Synthesis of Novel Nucleoside Analogs as Potential Antiviral Agents," Abstract *American Assoc. of Pharmaceutical Scientists*, vol. 9, No. 10, 1992.

Chu M. et al., "Isolation and Structure of SCH 351633: A Novel Hepatitis C Virus (HCV) NS3 Protease Inhibitor from the Fungus *Penicillium griseofulvum*," *Bioorganic and Medicinal Chemistry Letters* 9:1949-1952, 1999.

Chu M. et al., "Structure of Sch 68631: A New Hepatitis C Virus Proteinase Inhibitor from *Streptomyces* sp.," *Tetrahedron Letters* 37:7229-7232, 1996.

Coe et al., "Preparation of Nucleotide Mimics with Potent Inhibitory Activity Against HIV Reserve Transcriptase," *J. Chem. Soc.* Perkin Trans 1, 3378-3379, 1991.

Crumpton, S. et al., "Novel Lipid Analogs with Cytostatic and Cytocidal Activity," *Anticancer Research*, vol. 8, No. 6, pp. 1361-1366, Nov.-Dec. 1988.

Daniel, L. W. et al., "Alkyl-Linked Diglygerides Inhibit Protein Kinase C Activation by Diacylglycerols," *Biochemical & Biophysical Research Communications*, 151, 291-97, Feb. 29, 1988.

DeClercq, *Jounral of Medicinal Chemistry* 38:2491-2517, 1995.

Del Pan et al., *Proc. Amer. Soc. for Clinical Oncology*, Abstract #1384, 1997.

Dietzfelbinger, "Cytotoxic and Purging Effects of ET-18-OCH3 in Human Malignant Lymphoid Cell Lines in Vitro," Abstract 2472, *Proceedings of the American Assoc. for Cancer Res.*, 31, 416, Mar. 1990.

Domawchowske J. B. et al., "Respiratory Syncytial Virus Infection: Immune Response, Immunopathogenesis and Treatement," *Clinical Microbiology Reviews*, 12:298-309, Apr. 1999.

Englund, J. A., "Prevention Strategies for Respiratory Syncytial Virus: Passive and Active Immunization," *J. Pediatr.*, 135:38-44, Aug. 1999.

Eron et al., *AIDS* 12: F181-F189, 1998.

Falsey A. R. et al., "Acute Respiratory Tract Infection in Daycare Centers for Older Persons," *J Am Geriatric Soc.*, 43:30-36, 1995.

Falsey, A. R. et al., "Viral Respiratory Infections in the Institutionalized Elderly: Clinical and Epidemiologic Findings," *J Am Geriatric Soc.*, 40:115-119, 1992.

Fauci, *Nature (New Biology)*, 384: 529-534, 1996.

Fields, A. P. et al., "Human Immunodeficiency Virus Induces Phosphorylation of its Cell Surface Receptor," *Nature*, 333, 278-80, May 19, 1988.

Galderisi U. et al., "Antisense Oligonucleotides as Therapeutic Agents," *Journal of Cellular Physiology*, 181:251-257, 1999.

Gill et al., *Annals of Internal Medicine* 107: 502-505, 1987.

Glezen W. P. et al., "Risk of Primary Infection and Reinfection with Respiratory Syncytial Virus," *Am J Dis Child*, 140:543-546, 1986.

Goodman and Gilman, *The Pharmacological Basis of Therapeutics*, Ninth Ed., 1996.

Gordeev, K. et al., "Synthesis of Thio Analogs of Platlet Activating Factor (PAF)," *Abstract Bioorg. Khim.*, vol. 12, No. 7, pp. 951-955, 1986.

Graham, F. L. et al., "A New Technique for the Assay of Infectivity of Human Adenovirus 5-DNA," *Virology*, vol. 52, pp. 456-467, 1973.

Guerguerian, A. et al., "Ribavirin in Ventilated Respiratory Syncytial Virus Bronchiolitis: a Randomized, Placebo-Controlled Trial," *Am J Resp Crit Care Med.*, 160:829-834, 1999.

Hall C. B. et al., "Infectivity of Respiratory Syncytial Virus by Various Routes of Inoculation," *Infect Immun.*, 33:779-783, 1981.

Hall, C. B. et al., "Nosocomial Respiratory Syncytial Virus Infections," *N Engl J Med.*, 293:1343-1346, 1975.

Hall C. B. et al., "Respiratory Syncytial Virus Infections Within Families," *N Engl J Med*, 294:414-419, 1976.

Hancock et al., "Analogs of Natural Lipids. VII. Synthesis of Cyclopentanoid Analogs of Phosphatidylcholine," *Journal of Lipid Research*, vol. 23, 183-189, 1982.

Harada, S. et al., "Infection of HTLV-III/LAV in HTLV-I-Carrying Cells MT-2 and MT-4 and Application in a Plaque Assay," *Science*, 229, 563-566, Aug. 9, 1985.

Hayashi et al., "Antitumor Activity of a Novel Nucleotide Derivative, 5'-(1,2 Dipalmitoyl-sn-glycero-3-phospho)-5-fluorouridine (TJ14026) on Murine Tumors," *Biol. Pharm. Bull.*, 16(8), 778-81, 1993.

Henderson, F.W. et al., "Respiratory-Syncytial-Virus Infections, Reinfections, and Immunity: a Prospective, Longitudinal Study in Young Children," *N Engl J Med,*, 300:530-534, 1979.

Hendrickson, H., et al., "A Facile Asymmetric Synthesis of Glycerol Phospholipid via Tritylglycidol Prepared by the Asymmetric Epoxidation of Allyl Alcohol," *Abstract Chem. Phys. Lipids*, vol. 53, No. 1, pp. 115-120, 1990.

Himmelmann, "Studies on the Cross Resistance Pattern of Membrane-Toxic Lipids in Vitro," *Abstract 2448, Proceedings of the American Assoc. for Cancer Res.*, 31, 416, Mar. 1990.

Hirsch, M. S. et al., "Antiviral Agents," *Fields Virology*, Third Edition, Lippincott, Raven Publishers, p. 431-466, 1996.

Hong et al., *Journal of Medicinal Chemistry* 33: 1380-1386, 1990.

Hong et al., *Cancer Res.* 50: 4401-4406.

Hong, C. et al., "Nucleoside Conjugates. 15. Synthesis and Biological Activity of Anti-HIV Nucleoside Conjugates of Ether and Thioether Phospholipids," *Abstract J. Med. Chem.*, vol. 39, No. 9, pp. 1771-1777, 1996.

Hong, C. et al., "Nucleoside-Ether Lipid Conjugates as Biotransformed Prodrugs of Antitumor and Antiviral Nucleosides," *Abstract J. Lipid Mediators Cell Signaling*, vol. 10, No. 1-2, pp. 159-161, 1994.

Hostetler, et al., "Antiviral Activity of Phosphatidyl-Dideooxycytidine in Hepatitis B-infected Cells and Enhanced Hepatic Uptake in Mice," *Antiviral Research,*, 59-65, 1994.

Hostetler et al., "Phosphatidylazidothymidine and Phosphatidyl-ddC: Assessment of Uptake in Mouse Lymphoid Tissues and Antiviral Activities in Human Immunodeficiency Virus-Infected Cells and in Rauscher Leukemia Virus-Infected Mice," *Antimicrobial Agents and Chemotherapy*, Dec. 2792-2797, 1994.

Hostetler et al., "Synthesis and Antiretroviral Activity of Phospholipid Analogs of Azidothymidine and Other Antiviral Nucleosides," *Journal of Biological Chemistry*, 265: 6112-6117, 1990.

Hostetler et al., "Phosphatidylazidothymidine: Mechanism of Antiretroviral Action in CEM Cells," *Journal of Biological Chemistry*, 266: 11714-11717, 1990.

Hruska, J. F. et al., "In Vivo Inhibition of Respiratory Syncytial Virus by Ribavirin," *Antimicr Agents Chemother.*, 21:125-130, 1982.

Hsu, L. et al., "Synthesis of Anti-Restricted Pyrimidine Acyclic Nucleosides," *Journal of Organic Chemistry*, vol. 57, No. 12, pp. 3354-3358, 1992.

IMPACT RSV Study Group, "Palivizumab, a Humanized Respiratory Syncytial Virus Monoclonal Antibody Reduces Hospitalization from Respiratory Syncytial Virus Infection in High-Risk Infants," *Pediatrics*, 102:531-537, 1998.

Jahne et al., "Preparation of Carbocyclic Phosphonate Nucleosides," *Tetrahedron Letters*, vol. 33, No. 37, 5335-5338, 1992.

Jayasuriya et al., Design, Synthesis, and Activity of Membrane-Disrupting Bolaphiles, *J. Am. Chem. Soc.* , 112, 5844-5850, 1990.

Jia et al., "Diamide Analogues of Phosphatidylcholine as Potential Anti-AIDS Agents," *J. Chem. Soc.*, 2521-2523, 1993.

Kakiuchi N. et al., "Non-peptide Inhibitors of HCV Serine Proteinase," *J. FEBS Letters*, 421:217-220, 1993.

Kasnar, B. et al., "Synthesis of 2',3'-Dideoxy- and 3'-Azido-2',3'Dideoxy-Pyridazine Nucleosides as Potential Antiviral Agents," *Nucleosides & Nucleotides*, 13(1-3), pp. 459-479, 1994.

Kawana, F. et al., "Inhibitory Effects of Antiviral Compounds on Respiratory Syncytial Virus Replication In Vitro," *Antimicrob Agents Chemother.*, Aug. 31, (8):1225-30, 1987.

Korba, B. E. et al., "Use of a Standardized Cell Culture Assay to Assess Activities of Nucleoside Analogs Against Hepatitis B Virus Replication," *Antiviral Research*, 19, 55-70, 1992.

Krugner-Higby, L., et al., "Membrane-Interactive Phosphilipids Inhibit HIV Type 1-Induced Cell Fusion and Surface gp160/gp120 Binding to Monclonal Antibody," *AIDS Research and Human Retroviruses*, vol. 11, 705-712, 1995.

Krugner-Higby, L. A. et al., "Novel Membrane Interactive Ether Lipid Analogs Inhibit HIV-1 Glycoprotein Interaction with CD4+Cells," Abstract 321, *32nd Interscience Conf. on Antimicrobial Agents and Chemotherappy*, Anaheim, 164, Oct. 11-14, 1992.

Kucera, L. S., et al., "Activity of Triciribine and Triciribine-5'-Monophosphate Against Human Immunodeficiency Virus Types 1 and 2k" *Aids Research and Human Retroviruses*, vol. 9, No. 4, pp. 307-314, 1993.

Kucera, "Effect of Membrane-Active Ether Lipid (EL) Analogues on Human Immunodeficiency Virus Production Measured by Plaque Assay," *Annuals of the New York Academy of Sciences*, 545-548, Dec. 26, 1990.

Kucera, "Inhibition of HIV-1 Plaque Formation by a Novel Class of Membrane-Active Ether Lipid Analogs," *International Conference on AIDS*, Abstract No. W.C.O. 21, p. 528, Jun. 4-9, 1989.

Kucera, "Inhibition of Human Immunodeficiency Virus-1 (HIV-1) by Novel Membrane Interactive Ether Lipids," Abstract No. 2470, *Proceedings of the American Assoc. for Cancer Res.*, 31, 416, Mar. 1990.

Kucera, L., et al., "Inhibition of Human Immunodeficiency Virus Envelope Gycoprotein-Mediated Cell Fusion by Synthetic Phospholipid Analogs," *Antiviral Research*, p. A260, 1985.

Kucera, "Investigations on Membrane Active Ether Lipid Analogs that Alter Functional Expression of HIV-1 Induces Glycoproteins and Inhibit Pathogenesis," Abstract, *Innovations in Therapy of Human Viral Diseases, Symposium, Research Triangle Park*, 16, Dec. 6-9, 1992.

Kucera, L.S. et al., "In Vitro Evaluation and Characterization of Newly Designed Alkylamidophospholipid Analogues as Anti-Human Immunodeficiency Virus Type 1 Agents," *Antiviral Chemistry and Chemotherapy*, 9:157-165, 1998.

Kucera, L., et al., "Novel Ether Lipid Analogs of Platelet Activating Factor with Anti-Hepatitis B Virus Activity," Abstract, *ICAAC Orlando*, 1994.

Kucera, L. et al., "Novel Membrane-Interactive Ether Lipid Analogs That Inhibit Infectious HIV-1 Production and Induce Defective Virus Formation," *AIDS Research And Human Retroviruses*, 6, 491-501, 1990.

Kumar, R., et al., "Equal Inhibition of HIV Replication by Steroisomers of Phosphatidyl-Azidothymidine—Lack of Stereospecificity of Lysosomal Phospholipase $A_1$." *The Journal of Biological Chemistry*, 267, 20288-20292, 1992.

Larder et al., *Science* 243: 1731-1734, 1989.

Lister et al., "Cyclopentanoid Analogs of Phosphatidylcholine: Susceptibility to Phospholipase $A_2$," *Journal of Lipid Research*, vol. 29, 1297-1308, 1988.

Maccjak, D. J. et al., "Inhibition of Viral Replication by Nuclease Resistant Hammerhead Birozymes Directed Against Hepatitis C virus RNA," *Hepatology*, 30 Abstract 995, 1999.

M. MacCoss et al., "Synthesis and Biological Activity of Novel Nucleoside-Phospholipid Prodrugs," *4th International Round Table Nucleosides, Nucleotides and their Biological Applications*, Antwerp, Feb. 4-6, p. 255-263, Feb. 4-6, 1981.

Marasco, Jr., C. J., "The Synthesis and Biological Activity of Novel Alkylglycerol Derivatives as Inhibitors of Protein Kinase C Activity, Neoplastic Cell Growth, and HIV-1 Infectivity," *Dissertation for Ph.D., Univ. of No. Carolina, Chapel Hill*, 1990.

Marasco, C. J. et al., "Synthesis and Biological Activity of Novel Quaternary Ammonium Derivatives of Alkylglycerols as Potent Inhibitors of Protein Kincase C," *Journal of Medicinal Chemistry*, No. 33, pp. 985-992, Mar. 1990.

Marasco et al., "The Synthesis and Biological Testing of Alkyl Glycerols as Potential Inhibitors of Protein Kinase C," *American Assoc. of Pharmaceutical Scientists Abstract*, vol. 9, No. 10, 1992.

Marx, M. H. et al., "Synthesis and Evaluation of Neoplastic Cell Growth Inhibition of 1-N-Alkylamide Analogues of Glycero-3-Phosphocholine," *Journal of Medicinal Chemistry*, Abstract, 31, 858-863, Mar. 28, 1988.

Meert, K. L. et al., "Aerosolized Ribavirin in Mechanically Ventilated Children with Respiratory Syncytial Virus Lower Respiratory Tract Disease: a Prospective Double-Blind Randomized Trial," *Crit Care Med.*, Abstract 22:566-572, Apr. 1994.

Mertes et al., "Charge-Spatial Models. cis- and trans-3- and -4-Substituted Cyclohexyl Phosphates as Analogs of 2'-Deoxyuridine 5'-Phosphate," *J. Med. Chem.*, vol. 12(5), 828-832, 1968.

Meyer, K. L., et al., "In Vitro Evaluation of Phosphocholine and Quaternary Ammonium Containing Lipids as Novel Anti-HIV Agents," *J. Med. Chem*, 34, 1377-1383, 1991.

Meyer, "Synthesis and Evaluation of Anti-HIV-1 Ether Lipids," *AAPS Meeting*, Atlanta Abstract N. MN-510, p. S-41, Oct. 22-25, 1989.

Miller, R. H., et al., "Common Evolutionary Origin of Hepatitis B Virus and Retroviruses," *Proc. Natl. Acad. Sci. USA*, 83, pp. 2531-2535, Apr. 1986.

Mitsuya, H. et al., "Strategies for Antiviral Therapy in AIDS," *Nature*, 325, 773-78, Feb. 26, 1987.

Modest, "Combination Chemotherapy Studies with Antitumor and Antiviral Ether Lipid Analogs," Abstract 2471, *Proceedings of the American Assoc. for Cancer Res.*, 31, 416 Abstract 2471, Mar. 1990.

Modest, E., et al., "Comparison of Cell Kill Induced by Two Ether Lipids in Combination with Hyperthermia," *Proceedings of the American Association for Cancer Research; Preclinical Pharmacology Experimental Therapeutics*, vol. 31, pp. 416, Abstract 2467, Mar. 1990.

Modest, E. J. et al., "Pharmacological Effects and Anticancer Activity of New Ether Phospholipid Analogs," *The Pharmacological Effect of Lipids III: Role of Lipids in Cancer Research*, (IN PRESS), pp. 330-337, 1989.

Molla, A. et al., "Human Serum Attenuates the Activity of Protease Inhibitors Toward Wild-Type and Mutuant Human Immunodeficiency Virus," *Virology*, 250:255-262, 1998.

Morrey, J. D. et al., "Effects of Zidovudine on Friend Virus Complex Infection in Rfv-3$^{r/s}$ Genotype-Containing Mice Used as a Model for HIV Infection," *Journal of Acquired Immune Deficiency Syndromes*, 3, 500-10, 1990.

Morris-Natschke, S. L. et al., "Synthesis of Phosphocholine and Quaternary Amine Ether Lipids and Evaluation of in Vitro Antineoplastic Activity," *J. Med. Chem.*, 36:2018-2025, 1993.

Morris-Natschke, S. et al. "Synthesis of Sulfur Analogues of Alkyl Lysophosphospholipid and Neoplastic Cell Growth Inhibitory Properties," *J. of Med. Chem.*, 29, 2114-17, 1986.

Mutson, M. A. et al., "Two Distinct Subtypes of Human Respiratory Syncytial Virus," *The Journal of General Virology*, 66:2111-2124, Oct. 1985.

Nara, P. L. et al., "Simple, Rapid, Quantitative, Syncytium-Forming Microassay for the Detection of Human Immunodeficiency Virus Neutralizing Antibody," *AIDS Research and Human Retroviruses*, 3, 283-302, 1987.

Noseda, A. et al., "In Vitro Antiproliferative Activity of Combinations of Ether Lipid Analogues and DNA-interactive Agents Against Human Tumor Cells," *Cancer Research*, 48, 1788-1791, Apr. 1, 1988.

Noseda, A. et al., "Neoplastic Cell Inhibition with New Ether Lipids Analogs," *Lipids*, 22, 878-883, Nov. 1987.

Ostertag, W. et al., "Induction of Endogenous Virus and of Thymidine Kinase by Bromodeoxyuridine in Cell Cultures Transformed by Friend Virus," *Proc. Nat. Acad. Sci. USA*, 71, 4980-85, Dec. 1974.

Pacheco, D. Y. et al., "Mechanisms of Toxicity of Hepsulfam in Human Tumor Cell Lines," Abstract 2446, *Proceedings of the American Association for Cancer Research*, 81, 412, May 1990.

Painuly et al., "Preparative HPLC of an Experimental Anti-HIV Analogue of AZT: Azidothymidine Monophosphate Diglyceride (AZT-MP-DG)," *Journal of Liquid Chromatography*, 16(11), 2237-2248, 1993.

Pajouhesh et al., "Synthesis of Polar Head Group Homologs of All-trans-cyclopentano-phosphatidylcholine, Phosphatidyl-N, N-Dimethylethanolamine, and Phosphatidylethanolamine," *Journal of Lipid Research*, vol. 25, 294-303, 1984.

Piantadosi, C. et al., "Synthesis and Evaluation of Novel Ether Lipid Nucleoside Conjugates for Anti-HIV-1 Activity," *J. Med. Chem.*, 34, 1408-14, 1991.

Pidgeon, C. et al., "Anti-HIV Drugs Conjugated to the Glycerobackbone of Phospholipids," *The Journal of Biological Chemistry*, 7773-7778, 1993.

Pidgeon C. et al., "Novel Acylated Phospholipid Drugs for AIDS," *Chemical Abstract*, 120:69591, 1994.

The PREVENT Study Group, "Reduction of Respiratory Syncytial Virus Hospitalization Among Premature Infants and Infants with Bronchopulmonary Dysplasia Using Respiratory Syncytial Virus Immune Globulin Prophylaxis," *Pediatrics*, 99:93-99, 1997.

Poiesz et al., *Proc. Natl Acad. Sci. U.S.A.* 77: 7415-7419, 1980.

Prince, G. A., "The Pathogenesis of Respiratory Syncytial Virus Infection in Cotton Rats," *Am J Pathol Abstract.*, 93:771-91, 1978.

Qasim M.A. et al. "Interscaffolding Additivity. Association of $P_1$ Variants of Eglin c and of Turkey Ovomucoid Third Domain with Serine Proteinases,". *Biochemistry* 36:1598-1607, 1997.

Qiu et al., "Membrane Properties of Antiviral Phospholipids Containing Heteroatoms in the Acyl Chains," *Biochemistry*, 33(4), 960-72, 1994.

C. Raetz et al., "Phospholipid Derivative of Cytosine Arabinoside and its Conversion to Phosphatidylinositol by Animal Tissue," *Science* 196, 303-304, 1977.

Richman et al., *New England Journal of Medicine* 317: 192-197, 1987.

Rodriguez, W. J. et al., "Prospective Follow-Up and Pulmonary Functions from a Placebo-Controlled Randomized Trial of Ribavirin Therapy in Respiratory Syncytial Virus Bronchiolitis," *Arch Pediatr Adolesc Med*, 153:469-474, May 1999.

Runge et al., "Destruction of Human solid Tumors by Alkyl Lyso Phospho Lipids," *Journal of the National Cancer Institute*, vol. 64, 1301-1306, 1980.

Sable, C. A. et al., "Orthomyxoviral and Paramyxoviral Infections in Transplant Patients," *Infect Dis Clin North Am*, Abstract, 9:987-1003, Dec. 1995.

Sarin, P. S. et al., "Effects of a Novel Compound (AL 721) on HTLV-III Infectivity in Vitro," *The New England Journal of Medicine*, vol. 313, 1289-90, Nov. 14, 1985.

Scolaro M. J. et al., "Inhibition of Virus Replication with Oligonucleotides," Chemical Abstracts, 117:124476, 1992.

Sidoti et al., "Cytostatic Activity of New Synthetic Anti-Tumor AZA-Alkyllsophospholipids," *Int. J. Cancer* 51, 712-717, 1992.

Small, "Characterization of Cells Sensitive and Resistant to ET-18-OCH$_3$," Abstract 2447, *Proceedings of the American Assoc. for Cancer Res.*, 31, 416, Mar. 1990.

Smith, D. W. et al., "A Controlled Trial of Aerosolized Ribavirin in Infants Receiving Mechanical Ventilation for Severe Respiratory Syncytial Virus Infection," *New England Journal of Medicine*, 325:24-29, Jul. 1991.

Steim et al., "Lipid Conjugates of Antiretroviral Agents. I. Azidothymidine-Monophosphate-Digylceride: Anti-HIV Activity, Physical Properties, and Interaction with Plasma Proteins," *Biochemical and Biophysical Research Communications*, vol. 171, No. 1, 451-457, 1990.

Sudo K. et al, "Inhibitory Effects of Podphyllotoxin Derivatives on Herpes Simplex Virus Replication;" *Antiviral Chemistry and Chemotherapy* 9:186, 1998.

Sudo K. et al., "Establishment of an In Vitro System for Screening Hepatitis C Virus Protease Inhibitors Using High Performance Liquid Chromatography," *Antiviral Research* 32:9-18, 1996.

Sunamoto, J. et al., "Induction of Cytotoxic T Cell," *Chemical Abstracts*, 117:68365, 1992.

Surbone et al., *Annals of Internal Medicine*, 108: 534-540, 1988.

Surles, J. R. et al, "Multigram Synthesis of 1-Alkylamido Phospholipids," *Lipids*, 28, 55-57, 1993.

Swayze, E. E., et al., "Synthesis of 1-(2-Aminopropyl) Benzimidazoles, Structurally Related to the Tibo Derivative R82150, With Activity Against Human Immunodeficiency Virus," *Bioorganic & Medical Chemistry Letters*, vol. 3, No. 4, pp. 543-546, 1993.

Takeshita N. et al., "An Enzyme-Linked Immunosorbent Assay for Detecting Proteolytic Activity of Hepatitis C Virus Proteinase," *Analytical Biochemistry* 247:242-246, May 1, 1997.

Tarnowski et al., "Effect of Lyso Lecithin and Analogs on Mouse Ascites," *Cancer Research*, vol. 38, 339-344, 1978.

Thompson, J., et al., "Phospholipid Analog Inhibition of Human Immunodeficiency Virus Envelope Glycoprotein-Mediated Cell Fusion," *Abstracts of the 2nd National Conference on Human Retroviruses*, Session 18, 1995.

Tiollais, P., et al., "Hepatitis B. Virus," *Scientific American*, 116-123, Apr. 1991.

Van Wijk et al., "Synthesis and Antiviral Activity of 3'-azido-3' deoxythymidine Triphosphate Distearoylglycerol: A Novel : Phospholipid Conjugate of the Anti-HIV Agent AZT," *Chemistry and Physics of Lipids*, 70, 213-222, 1994.

Van Wijk, G. M. et al., "Spontaneous and Protein-Mediated Intermembrance Transfer of the Antiretroviral Liponucleotide 3'-Deoxythymidine Diphosphate Diglyceride," *Biochemistry*, 31, 5912-5917, Jun. 30, 1992.

Vos, G. D. et al., "Treatment of Respiratory Failure Due to Respiratory Syncytial Virus Pneumonia with Natural Surfactant," *Pediatr Pulmonol.*, Abstract 22:412-415, Dec. 1996.

Wang, E. E. et al., "Pediatric Investigators Collaborative Network on Infections in Canada (PICNIC) Prospective Study of Risk Factors and Outcomes in Patients Hospitalized with Respiratory Syncytial Viral Lower Respiratory Tract Infection," Abstract, *J Pediatr*, 126:212-219, Feb. 1995.

Whimbey, E. et al., "Community Respiratory Virus Infections Among Hospitalized Adult Bone Marrow Transplant Recipients," Abstract, *Clin Infect Dis.*, 22:778-782, May 1996.

Yamaue, H. et al., "Chemosensitivity Testing with Highly Purified Fresh Human Tumor Cells with the MTT Colorimetric Assay," Abstract, *Eur J Cancer*, 27:1258-1263, 1991.

Yanagawa, H. et al. "Spontaneous Formation of Superhelical Strands," *Journal of the American Chemical Society*, 111, 4567-70, Jun. 21, 1989.

Yarchoan, R. et al., "Therapeutic Strategies in the Treatment of AIDS," *Annual Reports in Medicinal Chemistry*, vol. 23, 253-263, 1988.

\* cited by examiner

US 7,551,837 B2

SEQUENCE COUNTER FOR AN AUDIO VISUAL STREAM

RELATED APPLICATIONS

This application claims the benefit, under 35 U.S.C. § 365 of International Application PCT/US02/20503, filed Jun. 28, 2002, which was published in accordance with PCT Article 21(2) on Mar. 13, 2003 in English and which claims the benefit of U.S. Provisional Application 60/316,373, filed Aug. 31, 2001.

FIELD OF THE INVENTION

This present invention relates to a method and apparatus for protecting content, and in particular, a method and apparatus for protecting audio-visual (A/V) content from repeat viewing without authorization.

BACKGROUND OF THE INVENTION

Content Protection (CP) systems are well known for providing protection of audio-visual (A/V) content. Typically, a content protection system includes a source device (e.g., set top box (STB), digital videocassette (DVCR or DVHS) player, digital versatile (or video) disc (DVD) player, etc.) and a sink device (e.g., digital television (DTV), etc.). As will be understood by those skilled in the art, the 'source' device is so named because it provides a source of A/V content. Similarly, the 'sink' device provides a medium for viewing the A/V content. In order to prevent multiple viewing of certain A/V content, a content protection system is typically installed between the source and he sink device. For example, in the case of a certain program recorded using a DVCR, the CP system will prevent viewing of the program beyond the limits set by the provider of the program (e.g., copyright holder). For instance, the provider may permit the program to be watched once, but not thereafter. In such a case, the CP system would prevent viewing of the program on the sink device (e.g., DTV) if the user attempts to play the program through the DVCR more than once.

Some commercially available products have recording systems which permit a function commonly known as 'video pause' mode (e.g., TiVO, etc.). These products are often referred to as Personal Video Recorders (PVRs). In some instances, a PVR may be integrated into a television or other apparatus to allow 'video pause' of the television picture. In operation, a 'live' A/V stream enters the television for viewing. This live A/V stream is transmitted to a recording device operating in a passive mode (e.g., computer memory, etc.) in the television before it is presented on the display screen of the television. Initially, the recording device operates only as 'pass-through', and passes the content stream on to the display screen unaltered, while at the same time making a copy of the content stream. When the user selects the 'video pause' function the output of the recording device is no longer sent to the display screen, but the recording continues. When the user deselects the 'video pause' function (i.e., 'unpauses' the television), the content stream from the recording device to the display screen resumes from the paused location, and the recording continues. The content stream viewed by the user is now delayed by the amount of the pause time. At this point, the user has the option of either watching the time delayed content stream, or 'catching up' with the live content stream by skipping portions of the recorded content stream. Consumers appreciate this feature as it allows them to carry out other tasks without having to miss portions of a live broadcast (e.g., you can go make a sandwich during a live football game and not miss a second of the action).

Another feature of PVRs is the ability to perform an 'instant replay' function (the playing of the same portion of content over and over again). Thus, if a user wished to watch a pivotal play in a football game over again several time to determine if the referee made a good call, the PVR typically permits the storing of content for this function as well.

However, 'video pause' and 'instant replay' functionality present several problems as well. Content providers desire to sell their most valuable content on a 'view only' basis (i.e., no recordings are permitted). By the same token, the content providers may want to control what functionality is allowed to consumers, for example, allowing a 'video pause' function, but preventing an 'instant replay' function.

Present solutions to this problem include licensing television manufacturers and prohibiting storage of the content for more than a specified period of time. For example, the 'video pause' recorder would only store the bit stream for a maximum of twenty four (24) hours. After the specified time period has expired, the recording device automatically erases the recording. This solution is problematic because if the recording device is hacked in the interim period (e.g., within 24 hours), the content is available to be copied. Additionally, if the recording device is somehow deceived about the time, the content may be available for longer periods then intended by the content provider.

Thus, there is presently a need for a method and apparatus for copy protecting content stored during video pause mode so that the content may only be viewed in the limited manner intended by the content providers.

SUMMARY OF THE INVENTION

The present invention comprises a method for implementing a conditional access system, including appending, in a source device, a sequence counter value to content transmitted from the source device to a sink device, storing the sequence counter value in the sink device, comparing the sequence counter value to a reference sequence counter value stored at the sink device, and providing an output signal which is viewable on the sink device if the sequence counter value is greater than or equal to the reference sequence counter value stored in the sink device.

The present invention also comprises a method for implementing a conditional access system, including receiving content and at least one sequence counter value in a sink device, storing the at least one sequence counter value in the sink device, comparing the sequence counter value to a reference sequence counter value stored at the sink device, and providing an output signal which is viewable on the sink device if the sequence counter value is greater than or equal to the reference sequence counter value stored in the sink device.

Further, the present invention comprises a conditional access system including a first source device and a first sink device coupled to the first source device, wherein the source device includes a first module for generating sequence counter values and appending the values to content transmitted from the source device to the sink device, and wherein the sink device includes a second module for storing the sequence counter values in the sink device.

Additionally, the present invention comprises a method for implementing a conditional access system, the method comprising appending a sequence counter value to content transmitted from a first source device to a sink device and a second source device, storing the sequence counter value together in the second source device, transmitting the sequence counter value together with the content from the second source device to the sink device, comparing the sequence counter value to a reference sequence counter value stored at the sink device, and providing an output signal which is viewable on the sink device if the sequence counter value is greater than or equal to the reference sequence counter value stored in the sink device.

The present invention also comprises a method for implementing a conditional access system, the method comprising receiving content and at least one sequence counter value in a source device, storing the at least one sequence counter value in the source device, transmitting the sequence counter value together with the content from the source device to a sink device, comparing the sequence counter value to a reference sequence counter value stored at the sink device, and providing an output signal which is viewable on the sink device if the sequence counter value is greater than or equal to the reference sequence counter value stored in the sink device.

The present invention also comprises a conditional access system including first and second source devices and a first sink device coupled to the first and second source devices, wherein the first source device includes a first module for generating sequence counter values and appending the values to content transmitted from the first source device to the sink device and the second source device, and wherein the sink device includes a second module for storing the sequence counter values in the sink device.

The present invention also comprises a method for implementing a conditional access system, comprising appending, in a source device, a sequence counter value to content transmitted from the source device to a sink device, storing the sequence counter value in a recording device connected to the source device and the sink device, transmitting the content and the sequence counter value from the recording device to the sink device, comparing the sequence counter value to a reference sequence counter value stored at the sink device, and providing an output signal which is viewable on the sink device if the sequence counter value is greater than or equal to the reference sequence counter value stored in the sink device.

The present invention also comprises a conditional access system including first and second source devices, a first sink device coupled to the first and second source devices, and a recording device coupled between the first source device and the sink device, wherein the first source device includes a first module for generating sequence counter values and appending the values to content transmitted from the first source device to the recording device and the second source device, and wherein the sink device includes a second module for storing the sequence counter values in the sink device, and wherein the recording device stores the content.

Finally, the present invention comprises a method for implementing a conditional access system, comprising receiving content and at least one sequence counter value in a sink device, storing the sequence counter value in a recording device connected to the source device and the sink device, transmitting the content and the sequence counter value from the recording device to the sink device, comparing the sequence counter value to a reference sequence counter value stored at the sink device, and providing an output signal which is viewable on the sink device if the sequence counter value is greater than or equal to the reference sequence counter value stored in the sink device.

DETAILED DESCRIPTION

The present invention is a method and apparatus for copy protecting audio-visual (A/V) content. Through the utilization of a sequence counter, viewing of content stored in a recording device may be significantly restricted. In an exemplary embodiment of the present invention, a first source device (e.g., set top box (STB)) is provided with a device identifier and a sequence counter, and a sink device (e.g., digital television (DTV), etc.) is equipped to store the device identifier and sequence counter values for the associated sink device. By comparing the sequence counter values transmitted by the first source device with sequence counter values stored in the sink device, protection of content may be accomplished.

Figure 1:
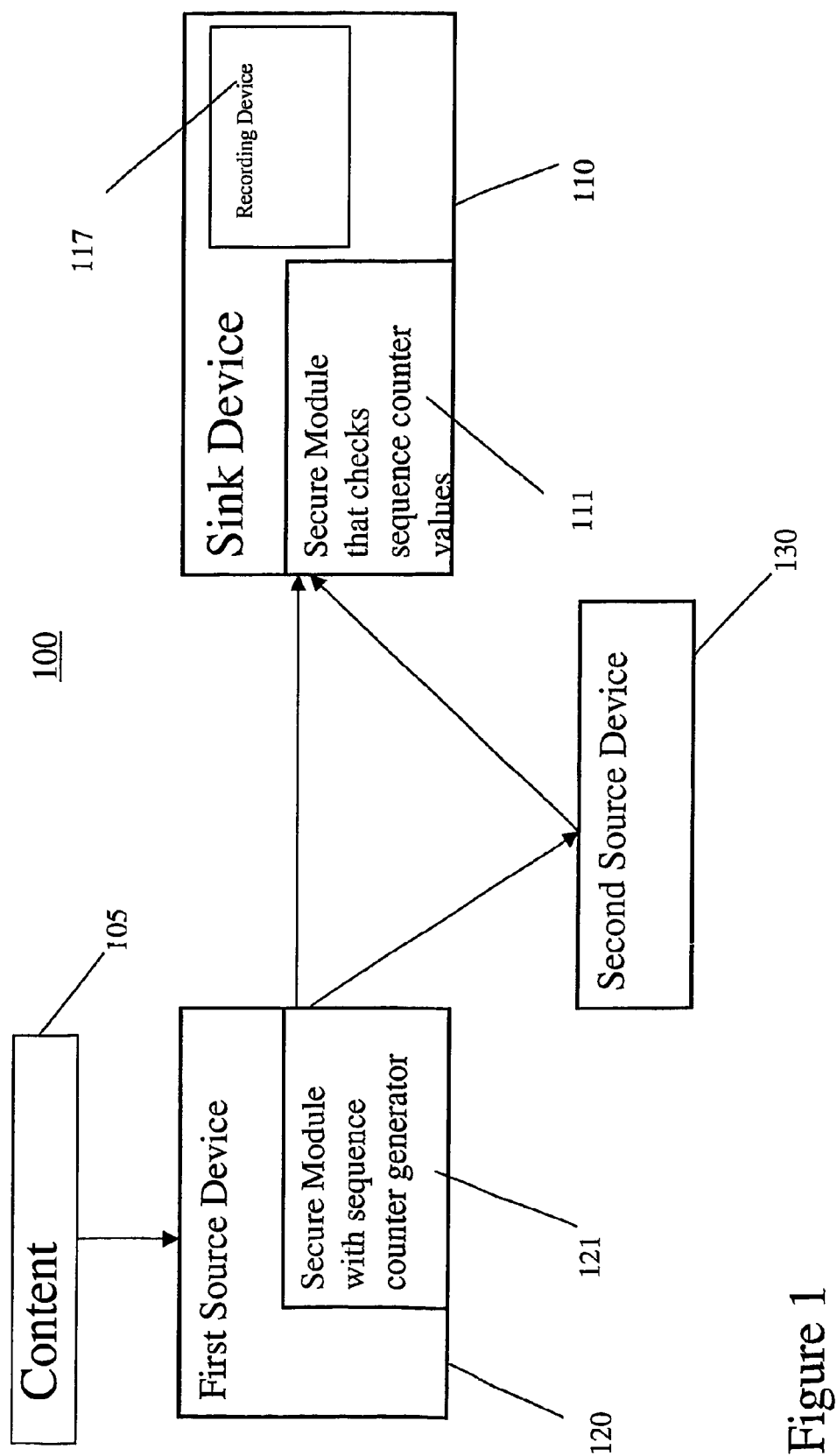
FIG. 1 is block diagram showing an apparatus according to a first exemplary embodiment of the present invention.

FIG. 1 shows a system 100 according to a first exemplary embodiment of the present invention. The system 100 comprises a content source 105, a sink device 110, such as a digital television (DTV), a first source device 120, such as a set top box (STB), digital versatile (or video) disc (DVD) player, or Personal Video Recorder (PVR), and a second source device 130 which permits recording, such as a digital videocassette (DVCR or DVHS) player/recorder, a digital versatile (or video) disc (DVD) player/recorder, or a PVR. As is well known in the art, a DVCR, a PVR or a DVD player/recorder will permit recording of content on a digital medium. In the exemplary embodiment shown in FIG. 1, the sink device 110 also preferably includes integrated therein a recording device 117 for executing a 'video pause' function.

The first source device 120 preferably includes a first secure module 121 which contains a sequence counter value generator. The sequence counter value generator may be of any suitable size, but is preferably 32 bit (generating 32 bit sequence counter values). Of course, those of ordinary skill in the art will realize that any bit size may be used for the sequence counter values (e.g., 40 bit, 56 bit, 64, bit etc.), depending on the desired security and relative complexity of the system. In accordance with the present invention, the first secure module generates sequence counter values and appends theses values to content which is transmitted by the first source device 120.

In the first exemplary embodiment, the second source device 130 comprises a means for playing and recording content, such as a DVD player/recorder or a DVHS/DVCR player/recorder. Those of ordinary skill in the art will realize that the second source device 130 may also include a secure module with a sequence counter, however, such is not necessary in the exemplary embodiment shown in FIG. 1 because it is assumed that all content which is recorded and played back by the second source device comes from the first source device 120 (and thus already contains the sequence counter values embedded therein). If the second source device 130 were to receive secured content from other outside sources, a secure module with sequence counter would be required in order to prevent unauthorized viewing of the content.

Preferably, the first source device 120 and the second source device 130 also have respective device identifiers (device IDs) associated therewith. The device ID may be, for example, the serial number value of the respective source devices 120, 130. These device IDs are used in the present invention to identify content with respect to the particular source device which originally supplied the content.

The sink device 110 preferably includes a second secure module 111 which checks the sequence counter values as they are transmitted with content from either the first source device 120 or the second source device 130. The second secure module 111 also updates respective sequence counter databases corresponding to each source device coupled to the sink device (e.g., source devices 120, 130, etc.) each time a new value is transmitted.

When content is transmitted from the first source device 120, the sequence counter values generated in the first secure module 121 are embedded in the content. It will be understood by those skilled in the art that the embedding of the sequence counter values in the content should be done in a secure manner so as to prevent a user from tampering with the sequence counter values. For example, the sequence counter value may be included as a data field in the Entitlement Control Message (ECM) that carries Control Words (CWs) for the content. This insures that any recording device (e.g., 130 or 117) will need to store the original counter values rather than replacing them. At periodic intervals (e.g., every 10 seconds), the sequence counter generator of the first secure module 121 is incremented and the new value is used in the content stream which is sent from the first source device 120. When the sink device 110 receives the sequence counter values, they are stored in respective sequence counter databases corresponding to each source device coupled to the sink device (e.g., source devices 120, 130). For example, the first sequence counter value transmitted with the content may be "0001", and successive sequence counter values may be "0002", "0003" and so on.

If the sink device 110 is coupled to more than one source device (such as shown in FIG. 1), the sink device 110 preferably retains (e.g., in a memory or otherwise) a list of all source devices from which it receives content as well as a list of the device IDs for each source device. In the above-described exemplary system 100, the sink device 110 would need to store the device ID for the first source device 120 and the device ID for the second source device 130, if both devices have the ability to receive secure content into the network to the sink device. For example, the sink device 110 may store device ID1 corresponding to the first source device 120 in a first memory location, and device ID2 corresponding to the second source device 130 in a second memory location.

When the sink device 110 is about to render content (e.g., display the content on a display screen of the sink device or a display screen coupled to the sink device) the sink device decrypts the ECMs to get the proper CWs for decryption of the content. As the decryption of the ECMs proceeds, the sink device 110 also recovers the sequence counter value embedded in the ECM and compares the value to the last value stored in the respective sequence counter for that source device. If the received sequence counter value is equal to or greater than greatest value that has already been transmitted by the particular source device (e.g., source device 120), the sink device 110 renders the content. If the sequence counter value is less than the greatest value that has already been transmitted by the particular source device (e.g., source device 120), the sink device 110 will not render the content (i.e., the sink device will not display the content on a display screen of the sink device or a display screen coupled to the sink device). Further, if the sequence counter value is higher than the greatest value that has already been transmitted by the particular source device (e.g., source device 120), the sink device also updates the stored sequence counter value for the respective source device (e.g., source device 120).

For example, if source device 120 transmits program A directly to the sink device 110 or second source device 130 for viewing, the first sequence counter value received by the sink device may be 0001. If the user engages the 'video pause' feature (recording device 117) of the television (sink device 110) before the next sequence counter value is received, the television continues-to receive content with higher sequence counter values (e.g., 0002, 0003, etc.), but the sequence counter value within the second secure module 111 of the sink device 110 is not updated. Thus, when the user returns and 'unpauses' the television, the content continues from the pause point and the sequence counter value is updated accordingly as the user watches the recorded version of the program.

Once the user has watched the 'paused' version of the program, he may not go back and watch the program again even though the program may remain stored in sink device 110. This is because the sequence counter value stored in second secure module 111 and associated with the source device 120 will have a reached a value corresponding to the end of the program (e.g., 0100), and thus will not permit re-viewing of portions with sequence counter values less than this value. The result of the above is that pausing of content may occur, but recording of content for a long period is effectively prevented.

The second source device 130 may also be used in the same manner as the recording device 117 to record programs for later viewing, and the first secure module 121 will provide protection therefor. For example, if the first source device 120 transmits program A to the second source device 130 for recording, the first sequence counter value received by the second source device may again be 0001. If the program has sequence counter values through 0100, and the user records the entire program, the user will be able to watch the recorded program on the sink device 110 at any later time, provided the user has not previously viewed the program on the sink device 110 (e.g., the user watched the program while recording it).

Accordingly, the above-described system 100 permits the following actions: (1) live viewing of content, (2) paused viewing, (3) viewing a short piece of the content over and over (provided that the sequence counter does not increment in the span that is being played), (4) pausing a program, watching something from another source device and then un-pausing the original program, and (5) watching one program on a first sink device and then watching the program again on another sink device. As far as the content provider is concerned, numbers (3) and (5) above are not optimal results, however, the content provider will likely submit to these results given the benefits provided by numbers (1), (2), and (4).

For example, consider two programs, Movie A and Movie B. Both Movie A and Movie B are transmitted from the same source device (e.g., source device 120) and are rendered on the same sink device (e.g., sink device 110). Movie A is transmitted with sequence counter values from 0001-1000 and Movie B is transmitted with sequence values from 1001-2000. If a recording of Movie A is made in the sink device 110 (e.g., using the 'video pause' feature) while movie A is also being viewed on the sink device, and the user 'pauses' the movie ("paused viewing"; Example (2) discussed above) at sequence counter value 573, the user may go back and watch portions of movie A with sequence counter values equal to and above 573 (e.g., 573-1000). Portions of Movie A which have sequence counter values from 1-572 may not be viewed. Similarly, if the user watches all of Movie A (through sequence counter value 1000), the user may not go back and watch any portion of the movie which was recorded in the sink device 110 (or recorded in an external device such as sink device 130) because each portion of the movie has a sequence counter value lower than the maximum stored value (e.g., 1000).

Additionally, if the user 'pauses' Movie A, watches Movie B, and then attempts to finish viewing Movie A, the user will not be permitted to watch the rest of Movie A as the sequence counter value for the sink device is now at the last sequence counter value in Movie B (e.g., 2000), and the unwatched portions of Movie A have lower sequence counter values. Although this result may not be ideal for consumers (i.e., because they have paid for all of Movie A and have only been permitted to watch part of it), the content provider prefers this result, as it prevents long-term storage of the recorded (paused) content (in this case Movie A).

Figure 2:
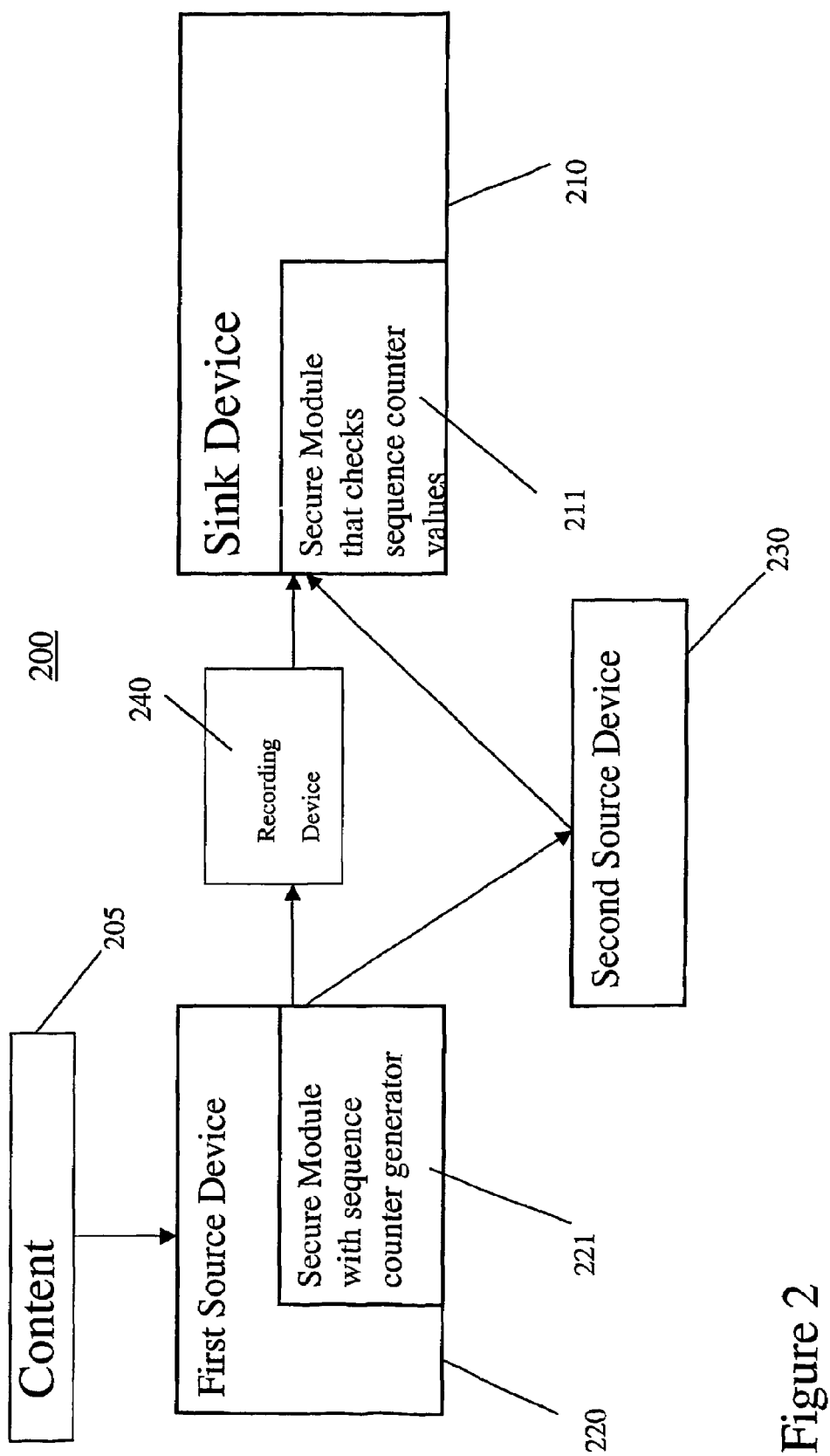
FIG. 2 is block diagram showing an apparatus according to a second exemplary embodiment of the present invention.

FIG. 2 shows a system 200 according to a second exemplary embodiment of the present invention. The system 200 is similar to system 100 described above, and like reference numerals denote like elements. The main difference between systems 100 and 200 is that, in system 200 the recording device 240 is disposed outside the sink device 110 (as opposed to being internal to the sink device). The system 200 comprises a content source 205, a sink device 210, such as a digital television (DTV), a first source device 220, such as a set top box (STB), digital versatile (or video) disc (DVD) player, or Personal Video Recorder (PVR), and a second source device 230 which permits recording, such as a digital videocassette (DVCR or DVHS) player/recorder, a digital versatile (or video) disc (DVD) player/recorder, or a PVR. As is well known in the art, a DVCR, a PVR or a DVD player/recorder will permit recording of content on a digital medium. The system 200 also includes a recording device 240 for executing a 'video pause' function. The system 200 operates substantially similarly to the system 100 described above, and therefore a detailed description is omitted here.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

The invention claimed is:

1. A method for implementing a conditional access system, comprising:
   transmitting, from a source device to a sink device, content comprising a sequence of content portions, each content portion having a respective sequence counter value appended thereto;
   determining, in the sink device, a reference sequence counter value, which corresponds to a most recently received sequence counter value;
   providing, in the sink device, an output signal representative of the content, wherein, the sink device
   compares a sequence counter value associated with a particular content portion requested for playback with the reference sequence counter value, and
   provides the output signal corresponding to the particular content portion in response to the comparison.

2. The method according to claim 1, wherein the sink device stores the content with the sequence counter values in a recording device.

3. The method according to claim 1, wherein the sink device provides the output signal if the sequence counter value associated with the particular content portion is greater than the reference sequence counter value.

4. The method according to claim 1, wherein each of the content portions is representative of a predetermined time duration of the content.

5. The method according to claim 1, wherein the sequence counter values are included in entitlement control messages transmitted with the content.

6. The method according to claim 1, wherein the content further includes a device identifier associated with the source device.

7. The method according to claim 6, wherein each of the content portions include the device identifier.

8. A method for receiving and processing content, comprising:
   receiving content comprising a sequence of content portions, each content portion having a respective sequence counter value appended thereto;
   determining a reference sequence counter value, which correspond to a most recently received sequence counter value;
   comparing a sequence counter value associated with a particular content portion requested for playback with the reference sequence counter value; and
   providing an output signal representative of the particular content portion in response to the comparison.

9. The method according to claim 8, further comprising storing the content with the sequence counter values in a recording device.

10. The method according to claim 8, wherein the providing step comprises providing the output signal if the sequence counter value associated with the particular content portion is greater than the reference sequence counter value.

11. The method according to claim 8, wherein each of the content portions is representative of a predetermined time duration of the content.

12. The method according to claim 11, wherein the sequence counter values are included in entitlement control messages transmitted with the content.

13. The method according to claim 8, wherein the content further includes a device identifier associated with the source device.

14. The method according to claim 6, wherein each of the content portions includes the device identifier.

15. An apparatus for receiving and processing content, comprising:
   means for receiving content from a source device, the content comprising a sequence of content portions, each content portion having a respective sequence counter value appended thereto;
   means for determining a reference sequence counter value, which correspond to a most recently received sequence counter value, and for comparing a sequence counter value associated with a particular content portion requested for playback with the reference sequence counter value; and
   means for processing the received content to provide an output signal representative of the particular content portion, the processing means providing the output signal in response to an output of the comparing means.

16. The apparatus according to claim 15, further comprising a recording device for storing the content with the sequence counter values.

17. The apparatus according to claim 15, wherein the processing means provides the output signal if the sequence counter value associated with the particular content portion is greater than the reference sequence counter value.

18. The apparatus according to claim 15, wherein each of the content portions is representative of a predetermined time duration of the content.

19. The apparatus according to claim 18, wherein the sequence counter values are included in entitlement control messages transmitted with the content.

20. The method according to claim 15, wherein the content further includes a device identifier associated with the source device.

21. The method according to claim 20, wherein each of the content portions includes the device identifier.

* * * * *